Jan. 22, 1957 — C. E. REISTLE, JR — 2,778,604
METHOD FOR PREVENTING LOST RETURNS
Filed Sept. 1, 1954

INVENTOR.
Carl E. Reistle, Jr.,
BY
ATTORNEY.

United States Patent Office 2,778,604
Patented Jan. 22, 1957

2,778,604

METHOD FOR PREVENTING LOST RETURNS

Carl E. Reistle, Jr., Houston, Tex., assignor, by mesne assignments, to Esso Research and Engineering Company, Elizabeth, N. J., a corporation of Delaware Application September 1, 1954, Serial No. 453,459

7 Claims. (Cl. 255—1.8)

The present invention is directed to a method for preventing loss of aqueous drilling fluid. More particularly, the invention is directed to combatting lost returns to porous highly permeable formations during drilling operations. In its more specific aspects, the invention is directed to sealing off thief formations which absorb water from drilling operations.

The invention may be briefly described as a method for preventing loss of aqueous drilling fluid to a thief formation penetrated by a well bore in a drilling operation in operations in which aqueous drilling fluid is normally circulated down a hollow drill stem and up the well bore which comprises locating at a level penetrating the thief formation where the aqueous driling fluid is being lost a body of dehydrated vegetable matter having the characteristic of increasing in bulk volume when contacted with water. The body is hydrated in place to cause same to increase in bulk volume a sufficient amount to seal off the formation which is taking water from the well bore. Thereafter, normal circulation of the drilling fluid is resumed.

The dehydrated vegetable matter employed in the practice of the present invention is suitably dehydrated carbohydrates, such as citrus pulp, oatmeal, tapioca, rice grains and the like. Other non-fibrous vegetable matter may be used, such as potatoes, carrots, beets, various grain sorghums, as illustrated by milo maize, cane seed, hegari grain, kafir corn, and the like which have the characteristic of swelling or increasing in bulk volume when contacted with water.

The amount of the carbohydrate or vegetable matter employed may range from about 5% to about 40% of the total volume of the aqueous drilling fluid or the aqueous medium with which it is contacted at the area or level in the well where lost returns are being employed. Ordinarily, 20% may give satisfactory results.

The degree of dehydration of vegetable matter obtained commercially ordinarily may suffice in the present invention. In short, rice grain, tapioca, oatmeal, and the like, as produced or processed for sale may be used in a substantially dehydrated condition such that on contact with or immersion in an aqueous medium an increase in volume or substantial swelling takes place within a short period of time, say from about 5 to 60 minutes.

The invention will be further illustrated by reference to the drawing in which.

Figure 1:
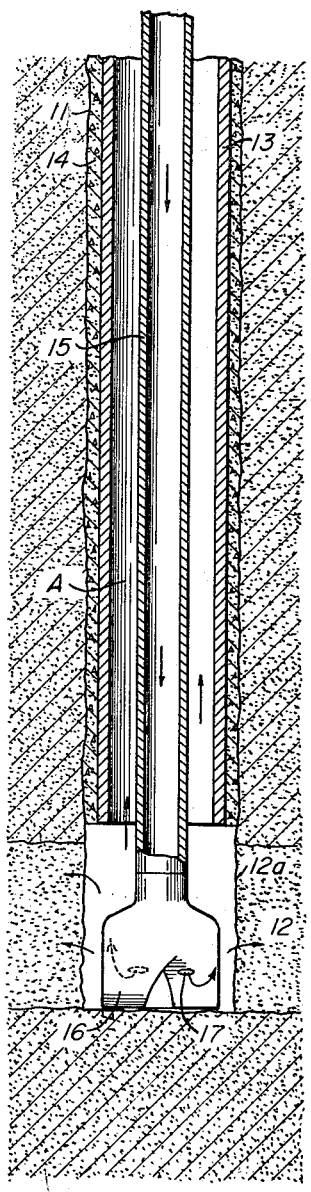
Fig. 1 is a view showing the condition of a well penetrating a zone of lost returns.

Referring now to the drawing, numeral 11 designates a well bore drilled from the earth's surface to penetrate a thief formation 12 to which aqueous drilling fluid is being lost in a direction indicated by the arrows.

The borehole 11 has a casing 13 arranged therein and cemented in place with primary cement 14.

A drill string 15 extends to the earth's surface, not shown, and is rotated by suitable drilling machinery. The lower end of the drill stem is provided with a drill bit 16 which may be one of a fish tail or rock bit type for drilling operations. The drill bit is provided with eyes 17 through which aqueous drilling fluid is circulated down the hollow drill stem 15 through the eyes 17 and up the annulus A between the drill string 15 and the casing 13. In this particular instance, a substantial amount of drilling fluid is being absorbed or is flowing outwardly into the thief formation 12.

Figure 2:
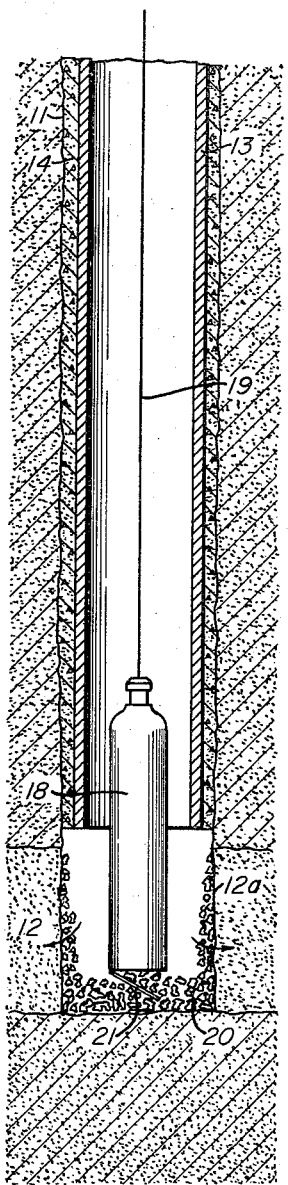
Fig. 2 shows the locating of the dehydrated carbohydrate in a dehydrated condition in a zone of lost returns.

In Fig. 2, the drill string 15 and the bit 16 have been withdrawn and a dump bailer 18 lowered down the casing 13 on a wire line 19. This dump bailer contains dehydrated vegetable matter, such as dehydrated citrus pulp which is located in the well bore adjacent the zone 12a of lost returns. This dehydrated vegetable matter is indicated by the numeral 20 and is released from the dump bailer 18 by release on opening of the door 21 which causes the dehydrated vegetable matter 20 to be deposited in the well bore 11 below the casing 13 and to follow the flow of lost returns into the formation 12.

Figure 3:
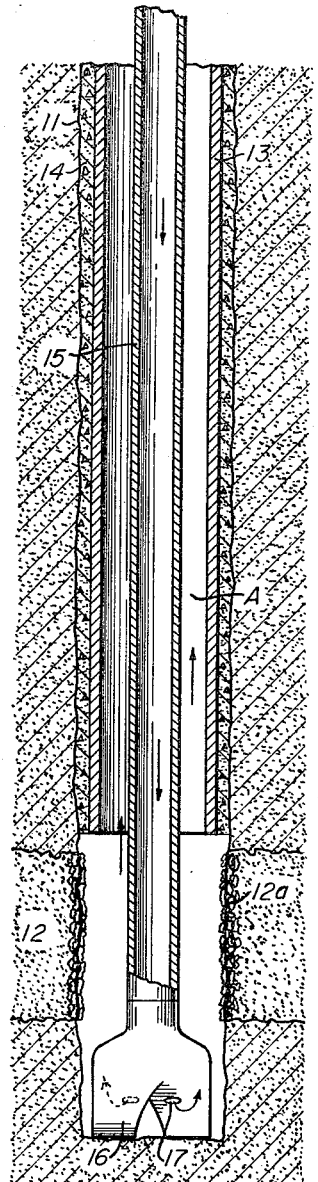
Fig. 3 shows the condition of the well after the dehydrated material has been hydrated.

Fluid pressure, such as that of the aqueous drilling mud or fresh or salt water, may be imposed on the dehydrated material to hydrate same and to force same into the zone 12a of lost returns in the formation 12 to seal off the tendency of the formation 12 to absorb or take water. Thereafter, as shown in Fig. 3, the drill string 15 is lowered again in the well after the dump bailer 18 has been withdrawn by wire line 19 and drilling resumed past the zone 12a of lost returns. It will be noted that the hydrated citrus pulp has increased in bulk in the zone 12a of lost returns and effectively sealed off the tendency of the formation 12 to take water, the flow of drilling fluid being normally down the drill string 15 through the eyes 17 and up the annulus A to the well head taking the cuttings therewith.

While it is preferred to locate or lower the dehydrated vegetable matter maintained in a dehydrated condition in a dump bailer, other means may be employed to locate same at the area of lost returns. This may suitably be done by placing the vegetable matter in a bag impervious to water, such as a bag of polyethylene and the like plastic materials, and forcing same down through the drilling mud to the desired area. Thereafter the bag may be ruptured by a suitable wire line tool, such as a knife, causing the dehydrated vegetable matter to be deposited in the area 12a of lost returns in the formation 12. It is also contemplated that the dehydrated material may be placed in the aqueous drilling mud after coating same with a water resistant material, such as a material which dissolves only slowly in water. As examples of this material may be mentioned gelatin, such as used in medicinal capsules, paraffin greases, and oils which may be displaced by water.

The invention will be further illustrated by the following operations:

To study the swelling properties of dehydrated citrus pulp and rice grains, operations were conducted at 80° and 150° F. in which 20 volumes of citrus pulp and rice which were suspended in various acidic, alkaline, and salt solutions to make a total of 100 volumes. The increase in volume was noted after 30 minutes immersion of the dehydrated vegetable matter. These results are presented in the following table:

Table 1

| Suspending Reagent | Citrus Pulp | | | | Rice Grain | | | |
| --- | --- | --- | --- | --- | --- | --- | --- | --- |
| | Final Wet Pulp Volume | | Percent Increase In Volume | | Final Wet Pulp Volume | | Percent Increase In Volume | |
| | 80° F. | 150° F. | 80° F. | 150° F. | 80° F. | 150° F. | 80° F. | 150° F. |
| Distilled water | 25 | 26 | 25 | 30 | 23 | 24 | 15 | 20 |
| 2.5 ml. 2 N sulfuric acid | 21 | 22 | 5 | 10 | 23 | 24 | 15 | 20 |
| 2.5 ml. 2 N sodium hydroxide | 28 | 28 | 40 | 40 | 23 | 24 | 15 | 20 |
| 2, 5, 10, 15, 35% sodium chloride | 25 | 26 | 25 | 30 | 23 | 24 | 15 | 20 |
| 2, 5, 10, 15, 35% magnesium sulfate | 25 | 26 | 25 | 30 | 23 | 24 | 15 | 20 |

It will be seen from the foregoing data that the citrus pulp had a maximum increase in volume when suspended in a caustic solution with the minimum increase in volume occurring in an acid medium. The data further reflect that the change in volume or swelling is independent of the salt concentration since a comparable increase is obtained in distilled water. Temperature increase does not affect the increase in volume since the increase in volume of both the citrus pulp and the rice grains seems to be independent of temperature effects.

The foregoing data indicate the desirability of the present invention in that it may suitably be used in alkaline solutions and in salty solutions, both of which are encountered in drilling operations. Furthermore, the temperature has no deleterious effect and this is important since high temperatures may be encountered in well drilling operations, such as oil or gas wells.

Furthermore, it was observed that when citrus pulp and rice grains were added to natural shale mud of 5 centipoise viscosity, 5% of the citrus pulp to 300 grams of the mud gave immediate Stormer viscosities of 62 and 85 centipoises, respectively. On standing 24 hours, the viscosities of both mud samples were beyond the range of the Stormer instruments. This further shows the desirability of the present invention of locating the material in a dehydrated condition at the level where the lost returns are being suffered since otherwise the mud qualities might be affected deleteriously. Furthermore, the data shown in the table indicate that locating the dehydrated material in the zone of lost returns is necessary because the material increases in volume to its maximum extent within about 30 minutes. If the carbohydrate or vegetable matter were mixed with the drilling mud and then pumped downwardly and allowed to hydrate while being pumped downwardly, the material would have increased substantially in volume to the extent that it would no longer increase in volume when arriving at the zone of lost returns and the benefits of the present invention would not be realized.

It will thus be seen from the foregoing data and the description of the drawing that a new and improved result is obtained by placing the dehydrated carbohydrate at the zone of lost returns in a substantially dehydrated condition. It is important that when the material is being lowered or located in the zone of lost returns, that it be maintained in dehydrated condition since otherwise the benefits of this invention may not be realized.

While the dump bailer 18 has been described as having an openable door 21, it is contemplated that any of the many dump bailers on the market may be used. For example, a dump bailer such as described in the Composite Catalog of Oil Field and Pipe Line Equipment, 19th edition, 1952-1953, on pages 3363 may be suitably used.

The nature and objects of the present invention having been completely described and illustrated, what I wish to claim as new and useful and to secure by Letters Patent is:

1. A method for preventing loss of aqueous drilling fluid to a thief formation penetrated by a well bore during a drilling operation in which aqueous drilling fluid is normally circulated down a hollow drill stem and up the well bore which comprises locating at a level penetrating the thief formation in said well where aqueous drilling fluid is being lost a body of dehydrated citrus pulp having the characteristic of increasing in bulk volume when contacted with water, said citrus pulp being coated with a material slowly displaceable in water, contacting said body with an alkaline aqueous medium in place under pressure for a sufficient time to displace the coating and to cause the pulp to increase in bulk volume a sufficient amount to seal off said thief formation, and then resuming normal circulation of said drilling fluid.

2. A method in accordance with claim 1 in which the aqueous medium is the aqueous drilling fluid.

3. A method for preventing loss of aqueous drilling fluid to a thief formation penetrated by a well bore during a drilling operation in which aqueous drilling fluid is normally circulated down a hollow drill stem and up the well bore which comprises the steps of lowering a body of dehydrated citrus pulp to a level in the thief formation in said well bore where aqueous drilling fluid is being lost, said citrus pulp being coated with a material slowly soluble in an alkaline aqueous medium, said body having the characteristic of increasing in bulk volume when contacted with water, contacting said body at said level with said alkaline aqueous medium under pressure for a sufficient time to dissolve the coating and to hydrate said pulp and cause same to increase in volume a sufficient amount to seal off said thief formation, and then resuming normal circulation of said drilling fluid.

4. A method for preventing loss of aqueous drilling fluid to a thief formation penetrated by a well bore during a drilling operation in which alkaline aqueous fluid is circulated down a hollow drill stem and up the well bore which comprises adding to said circulating fluid dehydrated citrus pulp coated with a material slowly soluble in water, said water soluble coating being adapted to dissolve in the circulating fluid at a level in said well bore approximate said thief formation thereby permitting said citrus pulp to swell and seal off the thief formation.

5. A method in accordance with claim 1 in which the coating material is gelatin.

6. A method in accordance with claim 1 in which the coating material is a water displaceable oil.

7. A method in accordance with claim 1 in which the coating material is a water displaceable paraffin grease.

(References on following page)

References Cited in the file of this patent

UNITED STATES PATENTS

| | | | |
|---|---|---|---|
| 1,807,082 | Boynton | May 26, | 1931 |
| 2,065,512 | Cannon | Dec. 29, | 1936 |
| 2,609,880 | Dyer | Sept. 9, | 1952 |
| 2,650,195 | Cardwell et al. | Aug. 25, | 1953 |

OTHER REFERENCES

Drilling Mud Practice, Petroleum Development & Technology, 1930, pp. 387 and 388.

"Composition and Properties of Oil Well Drilling Fluids," Rogers, Gulf Pub. Company © 1948, pages 449 to 451.